(12) United States Patent
Kubo et al.

(10) Patent No.: US 7,109,680 B2
(45) Date of Patent: Sep. 19, 2006

(54) INVERTER DEVICE

(75) Inventors: Mamoru Kubo, Gunma (JP); Kenji Nojima, Gunma (JP)

(73) Assignee: Sanyo Electric Co., Ltd., Osaka (JP)

( * ) Notice: Subject to any disclaimer, the term of this patent is extended or adjusted under 35 U.S.C. 154(b) by 0 days.

(21) Appl. No.: 11/047,697

(22) Filed: Feb. 2, 2005

(65) Prior Publication Data

US 2005/0174075 A1 Aug. 11, 2005

(30) Foreign Application Priority Data

Feb. 9, 2004 (JP) ............................. 2004-032211

(51) Int. Cl.
*G05B 19/404* (2006.01)

(52) U.S. Cl. ...................... 318/635; 318/635; 318/634; 318/641; 318/650; 361/31; 374/169

(58) Field of Classification Search .................... None
See application file for complete search history.

(56) References Cited

U.S. PATENT DOCUMENTS

| | | | |
|---|---|---|---|
| 4,336,001 A * | 6/1982 | Andrew et al. | |
| 4,494,162 A * | 1/1985 | Eyler | |
| 4,977,751 A * | 12/1990 | Hanson | |
| 5,054,294 A * | 10/1991 | Dudley | |
| 5,222,368 A * | 6/1993 | Hanson | |
| 5,669,231 A * | 9/1997 | Itoh et al. | |
| 5,701,753 A * | 12/1997 | Iritani | |
| 5,713,724 A * | 2/1998 | Centers et al. | |
| 6,114,828 A * | 9/2000 | Matsunaga et al. | |
| 6,122,153 A * | 9/2000 | Becker | |
| 6,147,470 A * | 11/2000 | Ohashi et al. | |
| 6,215,261 B1* | 4/2001 | Becerra | 318/254 |
| 6,222,349 B1* | 4/2001 | LeRow et al. | 322/34 |
| 6,229,278 B1* | 5/2001 | Garces et al. | 318/801 |
| 6,254,353 B1* | 7/2001 | Polo et al. | 417/44.11 |
| 6,278,256 B1* | 8/2001 | Aoyama | 318/801 |
| 6,288,510 B1* | 9/2001 | Toyama | 318/461 |
| 6,313,593 B1* | 11/2001 | Matsubara et al. | 318/434 |
| 6,324,038 B1* | 11/2001 | Kishibe et al. | 361/31 |
| 6,335,608 B1* | 1/2002 | Takahashi | 318/811 |
| 6,381,971 B1* | 5/2002 | Honda | 62/126 |
| 6,414,455 B1* | 7/2002 | Watson | 318/432 |
| 6,430,949 B1* | 8/2002 | Noro et al. | 62/183 |
| 6,459,230 B1* | 10/2002 | Tao | 318/798 |
| 6,461,112 B1* | 10/2002 | Ohta et al. | 417/26 |
| 6,471,486 B1* | 10/2002 | Centers et al. | 417/18 |
| 6,492,790 B1* | 12/2002 | Yoshikawa et al. | 318/727 |
| 6,525,506 B1* | 2/2003 | Jin | 318/801 |

(Continued)

FOREIGN PATENT DOCUMENTS

EP 0 539 163 A2 4/1993

(Continued)

*Primary Examiner*—Lincoln Donovan
*Assistant Examiner*—Robert W. Horn
(74) *Attorney, Agent, or Firm*—McDermott Will & Emery LLP

(57) ABSTRACT

An object is to provide an inverter device capable of realizing exact protection of the winding of a motor. An inverter device for generating a pseudo alternating current by switching a direct current to drive a motor, comprises a controller that executes vector control on the basis of a secondary current applied to the motor. The controller calculates a current density from the secondary current to execute a predetermined protection operation on the basis of the calculated current density. The controller imposes a restriction on the operation frequency of the motor on the basis of the current density.

4 Claims, 2 Drawing Sheets

U.S. PATENT DOCUMENTS

| | | | | |
|---|---|---|---|---|
| 6,563,288 B1* | 5/2003 | Ueno et al. | | 318/783 |
| 6,651,450 B1* | 11/2003 | Tamegai et al. | | 62/133 |
| 6,710,580 B1* | 3/2004 | Shinba | | 322/37 |
| 6,800,952 B1* | 10/2004 | Blackburn et al. | | 290/36 R |
| 6,809,428 B1* | 10/2004 | Blackburn et al. | | 290/37 R |
| 6,815,924 B1* | 11/2004 | Iura et al. | | 318/727 |
| 6,828,744 B1* | 12/2004 | Na | | 318/432 |
| 6,844,700 B1* | 1/2005 | Sakai et al. | | 318/801 |
| 6,854,881 B1* | 2/2005 | Nada | | 374/169 |
| 6,897,629 B1* | 5/2005 | Wilton et al. | | 318/139 |
| 2002/0074974 A1* | 6/2002 | Shinba | | 322/37 |
| 2002/0097020 A1* | 7/2002 | Ueno et al. | | 318/783 |
| 2002/0149341 A1* | 10/2002 | Tao | | 318/798 |
| 2004/0001291 A1* | 1/2004 | Boeffel | | 361/31 |
| 2004/0080333 A1* | 4/2004 | Klein | | 324/772 |
| 2004/0085087 A1* | 5/2004 | Zehentner et al. | | 324/772 |
| 2004/0114400 A1* | 6/2004 | Shinba | | 363/56.02 |
| 2004/0174723 A1* | 9/2004 | Yamanaka et al. | | 363/37 |
| 2004/0201359 A1* | 10/2004 | Kumar | | 318/783 |
| 2004/0207967 A1* | 10/2004 | Ohshima | | 361/93.1 |
| 2004/0239271 A1* | 12/2004 | Matsubara et al. | | 318/434 |
| 2005/0071090 A1* | 3/2005 | Katou | | |
| 2005/0174075 A1* | 8/2005 | Kubo et al. | | 318/254 |
| 2005/0174090 A1* | 8/2005 | Hayashi | | |

FOREIGN PATENT DOCUMENTS

| | | | |
|---|---|---|---|
| EP | 0 599 608 A2 | | 6/1994 |
| JP | 02187050 A | * | 7/1990 |
| JP | 06070533 A | * | 3/1994 |
| JP | 2629664 | | 4/1997 |
| WO | WO 01/10001 A2 | | 2/2001 |

\* cited by examiner

INVERTER DEVICE

BACKGROUND OF THE INVENTION

1. Field of the Invention

The present invention relates to an inverter device for generating a pseudo alternating current by switching a direct current to drive a motor.

2. Description of the Related Art

Conventionally, for example, in an air conditioner for a vehicle, a refrigerant is circulated in a refrigerant circuit by an engine-driven compressor to cool the interior of a compartment. However, attendant upon recent conspicuousness of environmental problems, cars using electric motors, such as electric cars, fuel cell powered cars, and hybrid powered automobiles, have been heartily developed. In such a car, because electric power is supplied from a battery to a main electric motor to run, an air conditioner uses a battery-driven electromotive compressor.

In that case, actually, a direct current from a battery is converted into a three-phase pseudo alternating current by an inverter including a plurality of switching element groups and then applied to a motor of an electromotive compressor to drive. However, if a surplus current flows in the winding of the motor, inconvenience such as burnout may arise. Thus, protection of the motor must be intended. For this reason, in a conventional general air conditioner for a home, the primary current flowing from a power source before entering an inverter is measured to make protection (for example, see Japanese Patent No. 2629664).

Here, in case of making motor protection using the primary current as described above, the secondary current flowing in the motor was calculated from the primary current as follows. That is, the power consumption is represented by $$W = \sqrt{3} \times Vrs \times Ir \times \cos\theta 1$$

in case of a three-phase alternating current power source and $$W = Vdc \times Idc$$

in case of a direct current power source, and the power consumption obtained from the secondary side is represented by $$W = \sqrt{3} \times Vuv \times Iu \times \cos\theta 2$$

(W: power consumption, Vrs: primary voltage, Ir: primary current, Vuv: secondary voltage, Iu: secondary current, and $\cos\theta$: power factor). Therefore, the secondary current Iu is represented by $$Iu = (Vrs \times Ir \times \cos\theta 1)/(Vuv \times \cos\theta 2)$$

or $$Iu = (Vdc \times Idc)/(\sqrt{3} \times Vuv \times \cos\theta 2).$$

Therefore, for obtaining the secondary current, the values of the power factor, Vrs, Vuv, and Vdc are necessary. If those values include errors, it is difficult to accurately estimate the secondary current.

SUMMARY OF THE INVENTION

The present invention has been made to solve such a conventional technical problem and is to provide an inverter device capable of realizing exact protection of the winding of a motor.

An inverter device according to the present invention for generating a pseudo alternating current by switching a direct current to drive a motor, comprises a controller that executes vector control on the basis of a secondary current applied to the motor. The controller calculates a current density from the secondary current to execute a predetermined protection operation on the basis of the calculated current density.

In the inverter device according to the present invention, the controller imposes a restriction on an operation frequency of the motor on the basis of the current density.

In the inverter device according to the present invention, the motor drives a compressor of a refrigerant circuit and the controller imposes a restriction on the valve opening of an expansion valve in the refrigerant circuit on the basis of the current density.

In the inverter device according to the present invention, the controller changes the protection operation on the basis of an index that influences the temperature of winding of the motor.

According to the present invention, the inverter device for generating a pseudo alternating current by switching a direct current to drive a motor, comprises a controller that executes vector control on the basis of a secondary current applied to the motor. The controller calculates a current density from the secondary current to execute a predetermined protection operation on the basis of the calculated current density. Therefore, using the secondary current used for vector control, a direct and exact protection operation can be performed from the value of the current flowing in the motor.

That is, if the controller imposes a restriction on the operation frequency of the motor when the current density obtained from the secondary current has risen, abnormal overheat or the like of the winding due to the rise of the current density can be prevented before it happens.

In addition, in case that the motor drives a compressor of a refrigerant circuit, if the controller imposes a restriction on the valve opening of an expansion valve in the refrigerant circuit on the basis of the current density, by expanding the valve opening the temperature rise of the winding of the motor can be prevented.

In addition, if the protection operation is changed on the basis of an index that influences the temperature of the winding of the motor, for example, if the protection operation is changed so that the restriction on the operation frequency or the restriction on the valve opening is early executed when the temperature of the refrigerant discharged from the compressor of the refrigerant circuit has risen, temperature rise of the winding of the motor can be more suppressed.

DETAILED DESCRIPTION OF THE PREFERRED EMBODIMENT

Figure 1:
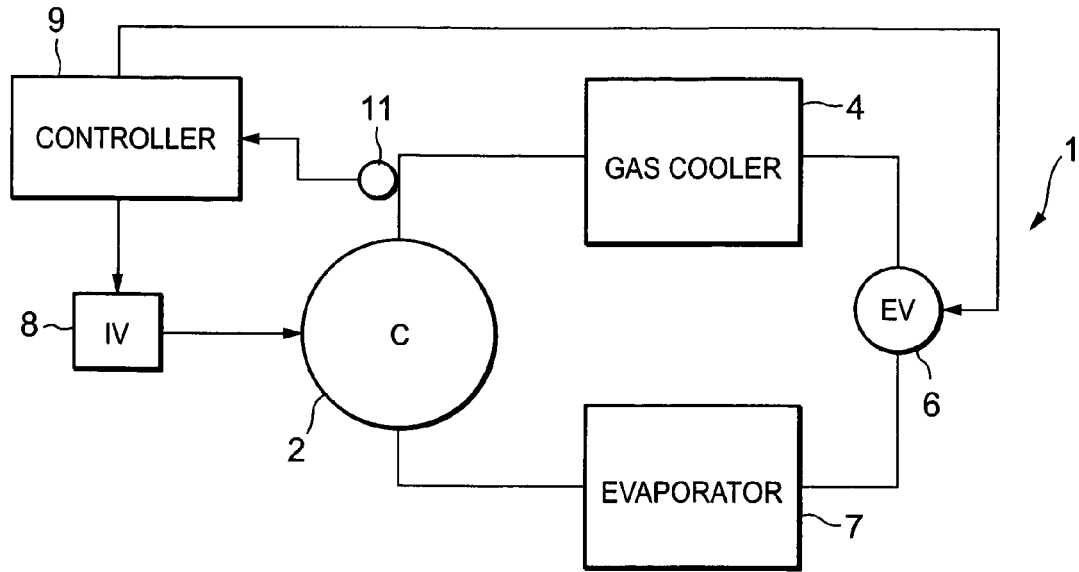
FIG. 1 is a refrigerant circuit diagram of an on-vehicle air conditioner to which the present invention has been applied.

Hereinafter, an embodiment of the present invention will be described in detail with reference to the accompanying drawings. An on-vehicle air conditioner 1 of the embodiment is for air-conditioning, for example, the interior of a compartment of a hybrid powered automobile. In the air conditioner 1, an electromotive compressor 2, a heat exchanger 4, an expansion valve (electromotive expansion valve) 6, an evaporator 7, and so on, are disposed in order into a loop and connected to each other to constitute a refrigerant circuit. The electromotive compressor 2 is controlled in its operation frequency by an inverter main circuit 8 and a controller 9 that constitute an inverter device 10 according to the present invention.

When a motor 3 of the electromotive compressor 2 is operated as will be described later, a refrigerant (such as carbon dioxide) is compressed by a not-shown compressing element in the electromotive compressor 2 and then discharged through the periphery of the motor 3 into the heat exchanger 4. The refrigerant radiates heat in the heat exchanger 4, then throttled by the expansion valve 6, flows in the evaporator 7, and evaporates there. At this time, the refrigerant exhibits a cooling function to cool the interior of the compartment. The refrigerant is then sucked in the electromotive compressor 2. This circulation is repeated. An output of a temperature sensor 11 for detecting the temperature of the refrigerant immediately after being discharged from the electromotive compressor 2 is input to the controller 9.

Figure 2:
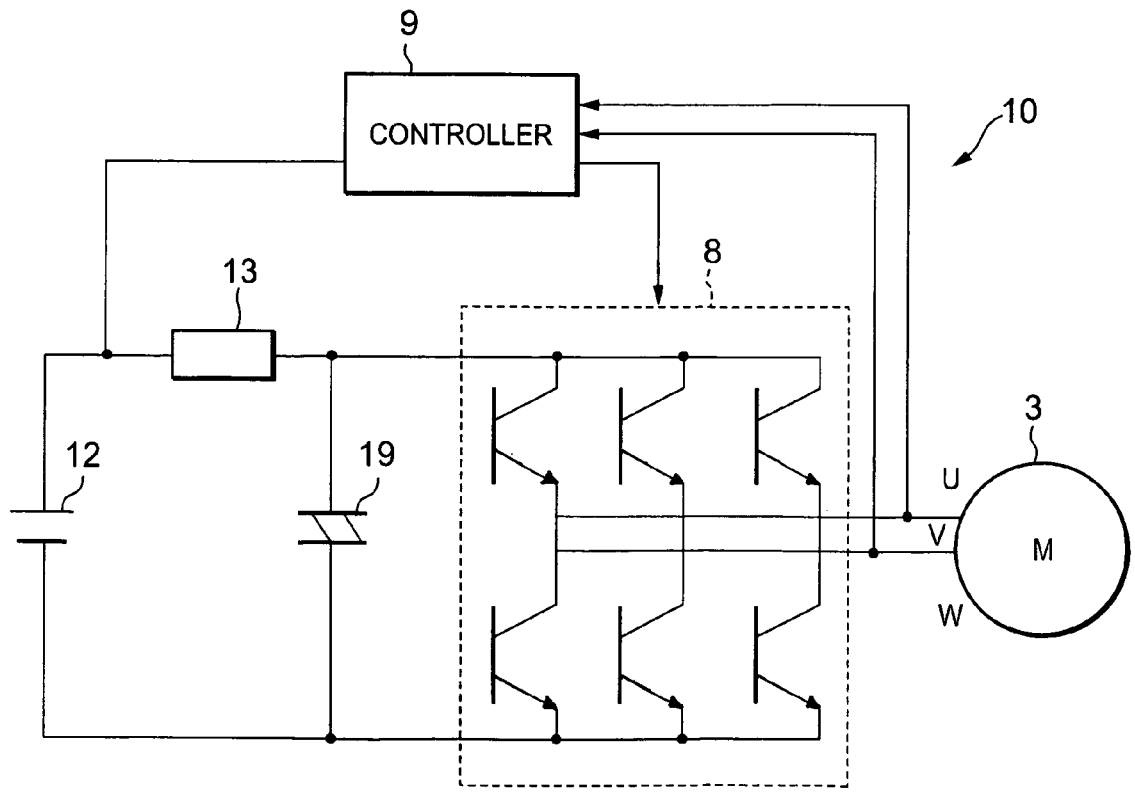
FIG. 2 is an electric circuit diagram of an inverter device according to the present invention.

Next, in FIG. 2, reference numeral 12 denotes a car battery. The above-described inverter main circuit 8 is connected to the battery 12 through a protection circuit 13. The inverter main circuit 8 is constituted by a plurality of (six in the embodiment) switching element groups. A charging capacitor 19 is connected in parallel to the inverter main circuit 8. The inverter main circuit 8 generates a three-phase pseudo alternating current (UVW-phase) from a direct current applied through the protection circuit 13, and applies the alternating current to the motor 3.

A secondary current (Iu, Iv) to be applied to the motor 3 is input from the inverter main circuit 8 to the controller 9. On the basis of the secondary current, the controller 9 performs switching of the switching element groups of the inverter main circuit 8 by vector control, and adjusts the frequency of the pseudo alternating current to control the operation (revolution speed) of the motor 3. For detecting the secondary current, there are a case of using a Hall element and a case of estimation from the shunt resistance. The voltage of the battery 12 (primary voltage) is also input to the controller 9.

Figure 3:
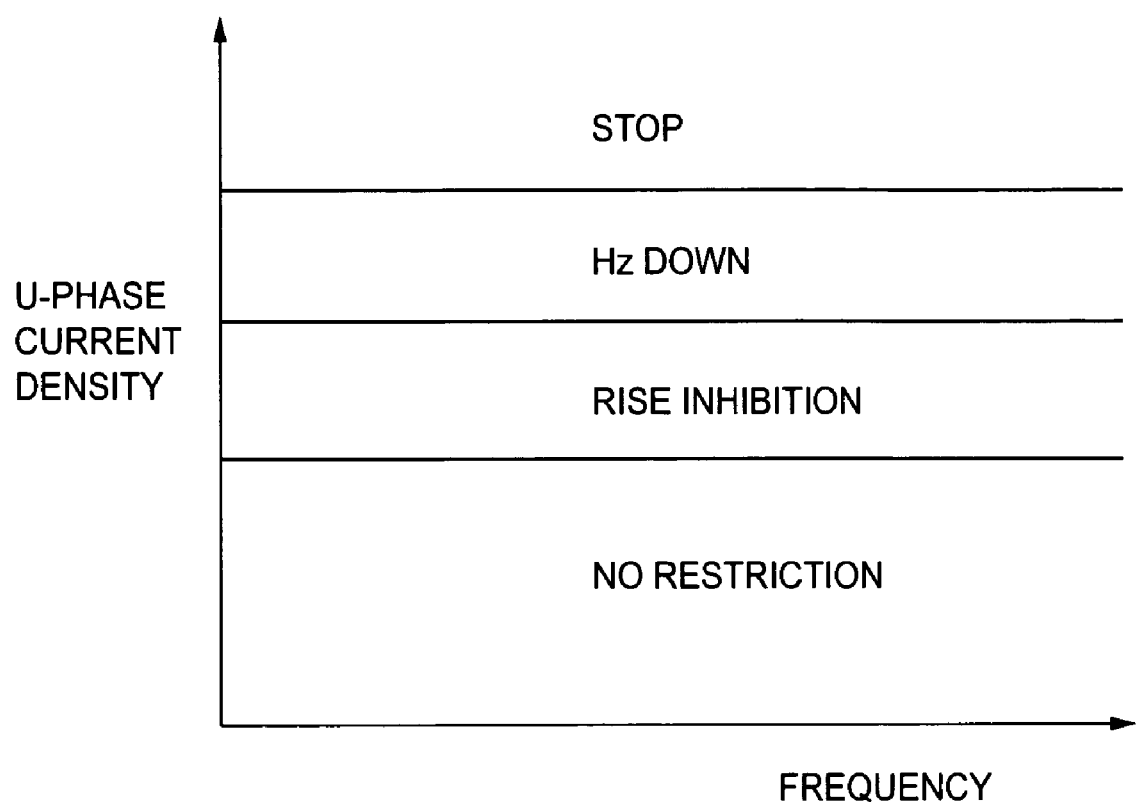
FIG. 3 is a graph for explaining a motor winding protection operation of the inverter device of FIG. 2.

Next, an example of motor winding protection operation by the controller 9 will be described with reference to FIG. 3.

EXAMPLE 1

The controller 9 calculates the U-phase current density flowing in the winding of the motor 3, from the secondary current (Iu) being used for vector control (the current value is divided by the cross-sectional area of the winding). When the U-phase current density is not more than a predetermined first upper limit value, the controller 9 controls the motor 3 to operate at a requested frequency determined from the temperature of the interior of the compartment, the set temperature, and so on (no restriction). Next, when the U-phase current density exceeds the first upper limit value, the controller 9 carries out a restriction of inhibiting the operation frequency of the motor 3 from rising, irrespective of the requested frequency.

Further, when the U-phase current density rises and exceeds a second upper limit value higher than the first upper limit value, the controller 9 controls the motor 3 so that the operation frequency of the motor 3 is lowered from the current value. Finally, at the time when the U-phase current density rises to a third upper limit value higher than the second upper limit value, the controller 9 controls the motor 3 to stop.

As described above, the controller 9 calculates the current density flowing in the winding of the motor 3, from the secondary current flowing in the motor 3, and adds restrictions to the operation frequency as the current density rises. Thus, rise of the temperature of the winding of the motor 3 can be avoided before it happens, and generation of an inconvenience such as burnout can be prevented.

In addition, on the basis of the output of the temperature sensor 11, when the temperature of the refrigerant discharged from the electromotive compressor 2 has risen to a predetermined value, the controller 9 lowers each of the above-described upper limit values, and thereby changes the protection operation so that the restrictions to the operation frequency may be early started. Because that refrigerant temperature is the temperature of the refrigerant having flowed on the periphery of the motor 3 in the electromotive compressor 2, the refrigerant temperature can be used as an index that influences the temperature of the winding of the motor 3. That is, it is estimated from rise of the refrigerant temperature that the actual temperature of the winding of the motor 3 has risen. Therefore, by detecting the rise of the actual temperature of the winding and changing the protection operation so that it can be early started, protection of the winding can be performed more surely.

EXAMPLE 2

Next, another example of protection operation by the controller 9 will be described. Also in this case, the controller 9 calculates the U-phase current density flowing in the winding of the motor 3, from the secondary current (Iu) being used for vector control. When the U-phase current density is not more than a predetermined upper limit value, the controller 9 adjusts the valve opening of the expansion valve 6 to a requested expansion valve opening determined from the temperature of the interior of the compartment, the set temperature, the temperature of each part of the refrigerant circuit, and so on.

Next, when the U-phase current density exceeds the upper limit value, the controller 9 expands the valve opening of the expansion valve 6 by a predetermined number of steps, irrespective of the requested expansion valve opening. Thus, the controller 9 calculates the current density flowing in the winding of the motor 3, from the secondary current flowing in the motor 3, and adds a restriction to the control to throttle the valve opening of the expansion valve 6 when the current density has risen. By expanding the valve opening, and rise of the temperature of the winding of the motor 3 is avoided before it happens, and generation of an inconvenience such as burnout is prevented.

Also in this case, on the basis of the output of the temperature sensor 11, when the temperature of the refrigerant discharged from the electromotive compressor 2 has risen to a predetermined value, the controller 9 lowers the above-described upper limit value, and thereby changes the protection operation so that the expansion of the valve opening of the expansion valve 6 may be early started.

In any of the above-described examples, the present invention is applied to an on-vehicle air conditioner for an automobile. However, the present invention is not limited to that. The present invention is effective for various apparatus in which the frequency of a motor is controlled with an inverter, such as an air conditioner for a home.

What is claimed is:

1. An inverter device for generating a pseudo alternating current by switching a direct current to drive a motor, the device comprising:
   a controller that executes vector control on the basis of a secondary current applied to the motor, the controller calculating a current density from the secondary current to execute a predetermined protection operation on the basis of the calculated current density.

2. The inverter device according to claim 1, wherein the controller imposes a restriction on an operation frequency of the motor on the basis of the current density.

3. The inverter device according to claim 1, wherein the motor drives a compressor of a refrigerant circuit and the controller imposes a restriction on the valve opening of an expansion valve in the refrigerant circuit on the basis of the current density.

4. The inverter device according to claim 1, 2, or 3, wherein the controller changes the protection operation on the basis of an index that influences the temperature of winding of the motor.

* * * * *